M. WILLIAMS.
Grain Thrasher and Separator.
No. 225,450. Patented Mar. 9, 1880.
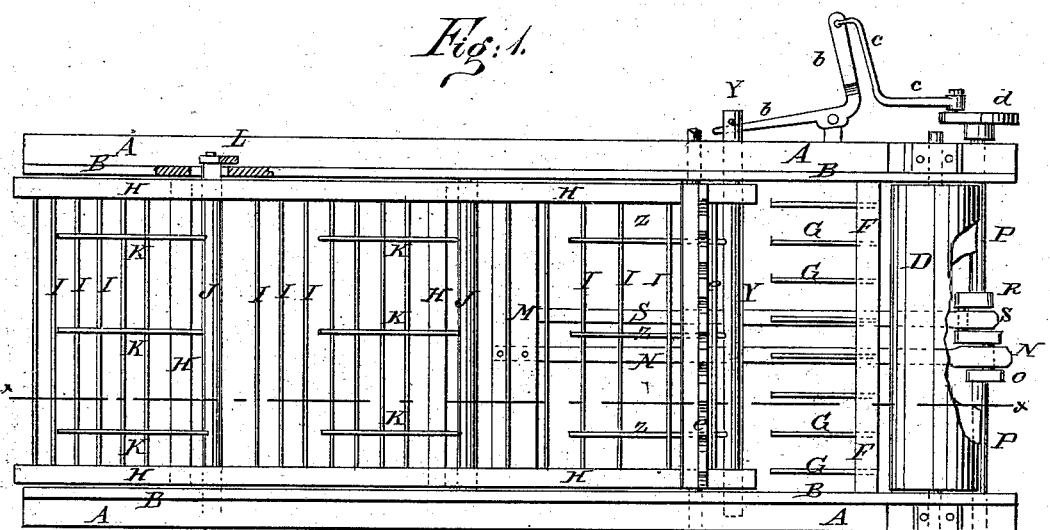
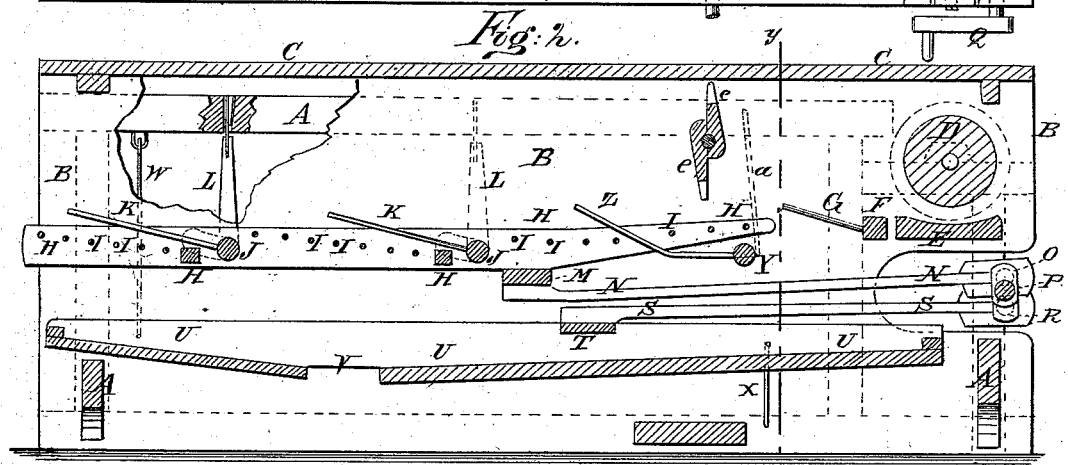
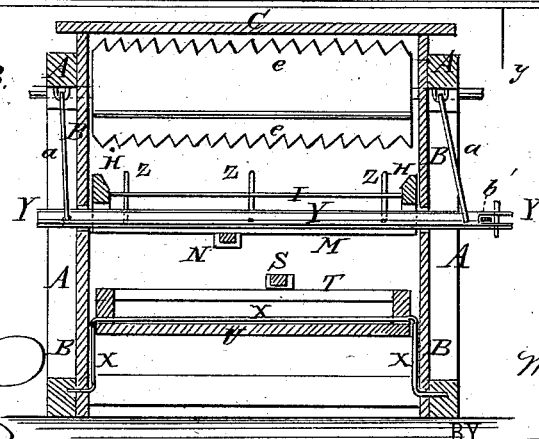

UNITED STATES PATENT OFFICE.

MARTIN WILLIAMS, OF ST. JOHNSVILLE, NEW YORK.

GRAIN THRASHER AND SEPARATOR.

SPECIFICATION forming part of Letters Patent No. 225,450, dated March 9, 1880.

Application filed December 30, 1879.

*To all whom it may concern:*

Be it known that I, MARTIN WILLIAMS, of St. Johnsville, in the county of Montgomery and State of New York, have invented a new and useful Improvement in Combined Grain Thrashers and Separators, of which the following is a specification.

Figure 1 is a plan view of the improvement, the top casing being removed. Fig. 2 is a sectional side elevation taken through the line *x x*, Fig. 1. Fig. 3 is a sectional end elevation taken through the line *y y*, Fig. 2.

The object of this invention is to furnish combined grain thrashers and separators so constructed as to separate the thrashed grain from the straw more thoroughly than machines constructed in the ordinary manner.

The invention consists in combining with a longitudinally-vibrating rack that supports the straw a superposed rotary beater and a laterally-movable fork, whereby the fork shakes the straw while held on the rack by the beater.

Similar letters of reference indicate corresponding parts.

A is the frame of the machine. B are the side casings, and C is the top casing. D represents the cylinder, and E the concave, of the thrasher, which are constructed and driven in the usual way.

At the inner side of the concave E is placed a cross bar or head, F, the ends of which are attached to the side casings B or the frame A of the machine. To the cross bar or head F are attached fingers or tines G, which incline forward and upward, as shown in Fig. 1, to receive the straw as it comes from the thrasher and cause it to rise and pass upon the frame H, and at the same time cause the thrashed grain to fall out. The frame H consists of side bars connected by cross-bars, and is provided with a series of rounds or cross-bars, I, placed so close together that the straw will not pass through between them, while the thrashed grain will fall through freely.

J are shafts or cross-heads, which pass through holes in the side bars of the rack-frame H, and through curved slots in the side casings B. To the shafts or heads J are attached fingers or tines K, which project upward and forward, so as to raise the straw from the rack H I as it moves over it, and thus facilitate the escape of the grain from the straw. To the ends of the heads J are rigidly attached the ends of arms L, which project upward along the outer sides of the side casings B, and are hinged at their upper ends to the top bars of the frame A.

With this arrangement, as the rack H I is vibrated longitudinally it carries the heads J with it, which gives to the tines K an up-and-down movement, tossing the straw and shaking the grain from the straw as the grain and straw are carried forward over the said rack.

To a cross-bar, M, attached to the lower sides of the side bars of the rack-frame H, is attached the inner end of a pitman, N, the outer end of which is pivoted to a crank, O, formed upon the shaft P. The shaft P revolves in bearings attached to the frame A, and to one of its ends is attached a crank, Q, or a pulley, by means of which motion is given to the shaft P. Upon the middle part of the shaft P is formed a second crank, R, to which is pivoted the outer end of the pitman S. The inner end of the pitman S is pivoted to a cross-bar, T, attached to the side bars of the apron U, so that the said apron U may be vibrated longitudinally by the revolution of the shaft P. The apron U inclines downward from its ends inward, and has an opening, V, in its lowest part.

With this construction the thrashed grain falls from the rack H I to the apron U, slides down the inclined parts of the said apron to the opening V, and falls through the said opening V into a receiver or into a clearing device. The forward end of the apron U is supported by the rods W, the upper ends of which are hinged to the top bars of the frame A. The lower ends of the rods W are bent inward at right angles, pass through curved slots in the casing B, and are pivoted to the side bars of the apron U. The rear end of the apron U is supported by the rod X, which passes through the side bars of the said apron U. The end parts of the rod X are bent downward at right angles, and their ends are bent outward at right angles, and are pivoted to the lower part of the casing B, so that the apron U may move freely when vibrated by the crank R and pitman S.

Below the ends of the tines of the delivery-forks F G is placed a shaft or cross-head, Y, to which are attached fingers or tines Z, projecting forward and inclining upward, as shown in Fig. 2. The ends of the head Y project through and work in bearings in the casing B. To the ends of fork-head Y are attached the lower ends of the rods $a$, the upper ends of which are hinged to the top bars of the frame A.

To one end of the head Y is pivoted the end of a bent lever, $b$, which is pivoted at its angle to the frame A. To the other end of the bent lever $b$ is pivoted the end of a bent connecting-rod, $c$, the other end of which is pivoted to a crank or crank-wheel, $d$, attached to the end of the shaft P. By this construction the fork Y Z will be vibrated crosswise of the machine by the revolution of the shaft V, so as to agitate the straw and shake out the grain more thoroughly as the straw passes from the delivery-fork F G to the rack H I.

Above the tines Z is placed a rotary beater, $e$, the journals of which revolve in bearings attached to the frame A. The rotary beater $e$ is designed to be driven by a belt and pulley from the driving mechanism of the machine. The edges of one or both of the wings of the beater $e$ are serrated, as shown in Fig. 3, so that the said beater may operate more effectively upon the straw.

With this construction the beater $e$ will operate upon the straw to drive it forward at the same time that the straw is being moved laterally by the vibrating fork Y Z, so as to more thoroughly separate the grain from the straw.

Having thus fully described my invention, I claim as new and desire to secure by Letters Patent—

The combination, with a longitudinally-reciprocating rack, H, of a superposed serrated rotary beater, $e$, and a laterally-reciprocating fork, Y Z, arranged with respect to each other to operate as and for the purpose specified.

MARTIN WILLIAMS.

Witnesses:
 HENRY SPRINGSTED,
 M. WALRATH, Jr.